(12) United States Patent
Naderializadeh et al.

(10) Patent No.: US 12,650,678 B2
(45) Date of Patent: Jun. 9, 2026

(54) SYSTEMS AND METHODS FOR DISTRIBUTED HIERARCHICAL CONTROL IN MULTI-AGENT ADVERSARIAL ENVIRONMENTS

(71) Applicant: THE BOEING COMPANY, Chicago, IL (US)

(72) Inventors: Navid Naderializadeh, Woodland Hills, CA (US); Sean Soleyman, Calabasas, CA (US); Fan Hin Hung, Woodland Hills, CA (US); Deepak Khosla, Camarillo, CA (US)

(73) Assignee: The Boeing Company, Arlington, VA (US)

(*) Notice: Subject to any disclaimer, the term of this patent is extended or adjusted under 35 U.S.C. 154(b) by 1083 days.

(21) Appl. No.: 17/483,421

(22) Filed: Sep. 23, 2021

(65) Prior Publication Data

US 2022/0107628 A1 Apr. 7, 2022

Related U.S. Application Data

(60) Provisional application No. 63/088,822, filed on Oct. 7, 2020.

(51) Int. Cl.
*G05B 19/4155* (2006.01)
*G06N 5/043* (2023.01)
*G06N 20/00* (2019.01)

(52) U.S. Cl.
CPC ......... *G05B 19/4155* (2013.01); *G06N 5/043* (2013.01); *G06N 20/00* (2019.01); *G05B 2219/33273* (2013.01)

(58) Field of Classification Search
CPC ........ G06N 5/043; G06N 20/00; G06N 3/045; G06N 3/086; G05B 19/4155; G05B 2219/33273; G05B 13/027
See application file for complete search history.

(56) References Cited

U.S. PATENT DOCUMENTS 8,019,712 B2 9/2011 Rigdon et al.
8,296,051 B2 10/2012 Cohen et al.
(Continued)

FOREIGN PATENT DOCUMENTS

| CN | 112131786 B | * | 9/2020 | ............. G06F 30/27 |
| EP | 3996058 A1 | * | 5/2022 | ........... G05D 1/0094 |
| EP | 3996058 B1 | * | 3/2024 | ........... G08B 29/188 |

OTHER PUBLICATIONS

Kong et al., Revisiting the Master-Slave Architecture in Multi-Agent Deep Reinforcement Learning, Dec. 2017 (Year: 2017).*
(Continued)

*Primary Examiner* — Tamara T Kyle
*Assistant Examiner* — Jacqueline C. Meyer
(74) *Attorney, Agent, or Firm* — Alleman Hall LLP

(57) ABSTRACT

A system is provided. The system includes a first platform including a first platform level agent configured to direct one or more actions of the first platform based on at least one of a selected target or a selected goal. The system also includes a computer system in communication with the first platform level agent. The computer system programmed to a) execute a supervisor level agent configured to select at least one of a target or a goal for one or more platforms including the first platform, b) receive targeting information including one or more targets, c) receive platform information for the one or more platforms, d) select, by the supervisor level agent, a target of the one or more targets based on the target information and the platform information, and e) transmit, to the first platform level agent, the selected target.

20 Claims, 6 Drawing Sheets

(56)                References Cited

U.S. PATENT DOCUMENTS

| | | | | |
|---|---|---|---|---|
| 9,262,928 | B2 | 2/2016 | Sampigethaya | |
| 11,699,083 | B2 * | 7/2023 | Cruise | G06N 5/043 |
| | | | | 706/10 |
| 2018/0165603 | A1 * | 6/2018 | Van Seijen | G06N 3/045 |
| 2022/0027798 | A1 * | 1/2022 | Liebman | G06N 5/043 |

OTHER PUBLICATIONS

Hanski et al., An Evaluation of the Unity Machine Learning Agents Toolkit in Dense and Sparse Reward Video Game Environments, Jul. 2021 (Year: 2021).*

R. Makar, et al. "Hierarchical multi-agent reinforcement learning," In Proceedings of the fifth international conference on Autonomous agents, pp. 246-253. ACM, 2001.

Z. Yang, et al. "Hierarchical deep reinforcement learning for continuous action control," IEEE Trans. Neural Netw. Learn. Syst., vol. 29, No. 11, pp. 5174-5184, Nov. 2018.

Ryan Lowe, et al. "Multi-agent actor critic for mixed cooperative-competitive environments," In Advances in Neural Information Processing Systems, pp. 6382-6393, 2017.

Sunehag, Peter, et al. "Value-decomposition networks for cooperative multi-agent learning based on team reward," Proceedings of the 17th international conference on autonomous agents and multiagent systems, International Foundation for Autonomous Agents and Multiagent Systems, 2018.

Rashid, T., et al. "Monotonic Value Function Factorisation for Deep Multi-Agent Reinforcement Learning,", Journal of Machine Learning Research 21 (2020) 1-52.

McGrew, J. S., "Real-Time Maneuvering Decisions for Autonomous Air Combat," Massachusetts Institute of Technology, 2008— Chapter 2.

* cited by examiner

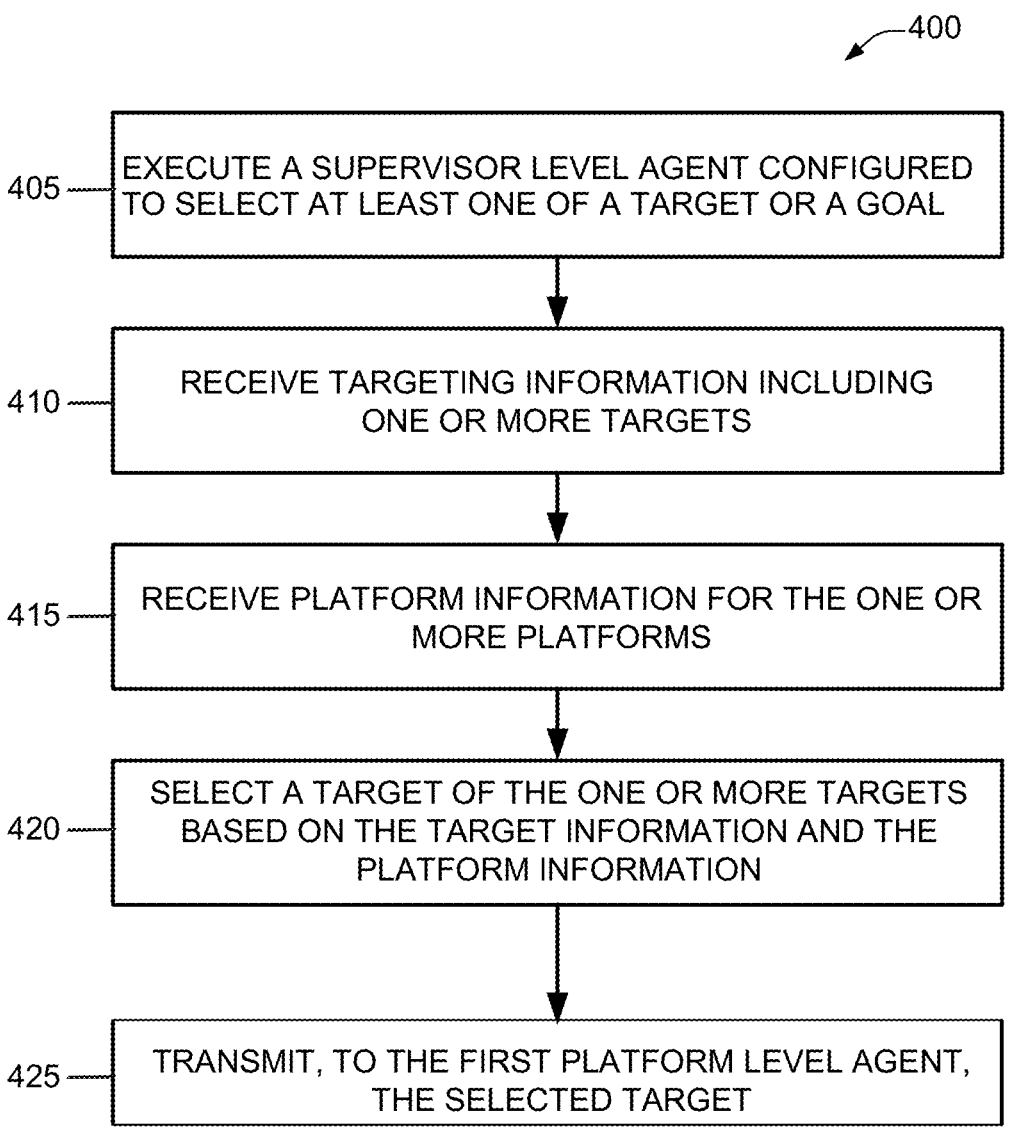

400

405 — EXECUTE A SUPERVISOR LEVEL AGENT CONFIGURED TO SELECT AT LEAST ONE OF A TARGET OR A GOAL

410 — RECEIVE TARGETING INFORMATION INCLUDING ONE OR MORE TARGETS

415 — RECEIVE PLATFORM INFORMATION FOR THE ONE OR MORE PLATFORMS

420 — SELECT A TARGET OF THE ONE OR MORE TARGETS BASED ON THE TARGET INFORMATION AND THE PLATFORM INFORMATION

425 — TRANSMIT, TO THE FIRST PLATFORM LEVEL AGENT, THE SELECTED TARGET

FIG. 4

SYSTEMS AND METHODS FOR DISTRIBUTED HIERARCHICAL CONTROL IN MULTI-AGENT ADVERSARIAL ENVIRONMENTS

RELATED APPLICATIONS

This application claims priority to U.S. Provisional Patent Application No. 63/088,822, filed Oct. 7, 2020, entitled "SYSTEMS AND METHODS FOR DISTRIBUTED HIERARCHICAL CONTROL IN MULTI-AGENT ADVERSARIAL ENVIRONMENTS," the entire contents and disclosure of which are hereby incorporated by reference herein in its entirety.

BACKGROUND

The field of the present disclosure relates generally to multi-agent systems and, more specifically, to training and controlling multi-agent systems in multi-agent adversarial scenarios.

The problem of multi-agent control is gaining significance in many areas, such as power grids, drone swarms, autonomous driving, air traffic control, etc. In many of these instances, there exist classical algorithms that rely on the domain knowledge and expertise and a model of the environment to control the agents. Many of these algorithms require a central controller which commands all the agents, making all the decisions for those agents in real-time. Such approaches are not scalable with the number of controlled agents and rely heavily on reliable communication between the central controller and the agents in the environment, which make them too fragile to be applicable to real-world environments. Moreover, such algorithms are mostly not robust enough to handle unforeseen situations in the environment.

On the other hand, learning-based approaches have also been developed for multi-agent environments, including several multi-agent deep reinforcement learning algorithms. Many of these algorithms train the agents in a centralized way, but enable the agents to perform decision making, i.e., inference, in a distributed manner once training is complete. However, there are issues when modeling physical movements of the agents in a team.

BRIEF DESCRIPTION

In one aspect, a system is provided. The system includes a first platform including a first platform level agent configured to direct one or more actions of the first platform based on at least one of a selected target or a selected goal. The system also includes a computer system including at least one processor in communication with at least one memory device. The computer system is in communication with the first platform level agent. The memory device includes computer-executable instructions that when executed by the at least one processor cause the at least one processor to execute a supervisor level agent configured to select at least one of a target or a goal for one or more platforms including the first platform. The instructions also cause the at least one processor to receive targeting information including one or more targets. The instructions further cause the at least one processor to receive platform information for the one or more platforms. In addition, the instructions cause the at least one processor to select, by the supervisor level agent, a target of the one or more targets based on the target information and the platform information. Moreover, the instructions cause the at least one processor to transmit, to the first platform level agent, the selected target. The first platform level agent is configured to control the first platform based on the selected target.

In another aspect, a method for controlling platforms is provided. The method is implemented by a computer device including at least one processor in communication with at least one memory device. The method includes executing a supervisor level agent configured to select at least one of a target or a goal for one or more platforms including a first platform. The method also includes receiving targeting information including one or more targets. The method further includes receiving platform information for the one or more platforms. In addition, the method includes selecting, by the supervisor level agent, a target of the one or more targets based on the target information and the platform information. Moreover, the method includes transmitting, to the first platform level agent, the selected target. The first platform level agent is configured to control the first platform based on the selected target.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawing's arrangements, which are presently discussed, it being understood, however, that the present embodiments are not limited to the precise arrangements and instrumentalities shown, wherein:

FIG. 4 illustrates a process for controlling agents using the system shown in FIG. 3 in the adversarial environment shown in FIG. 1.

DETAILED DESCRIPTION

Figure 1:
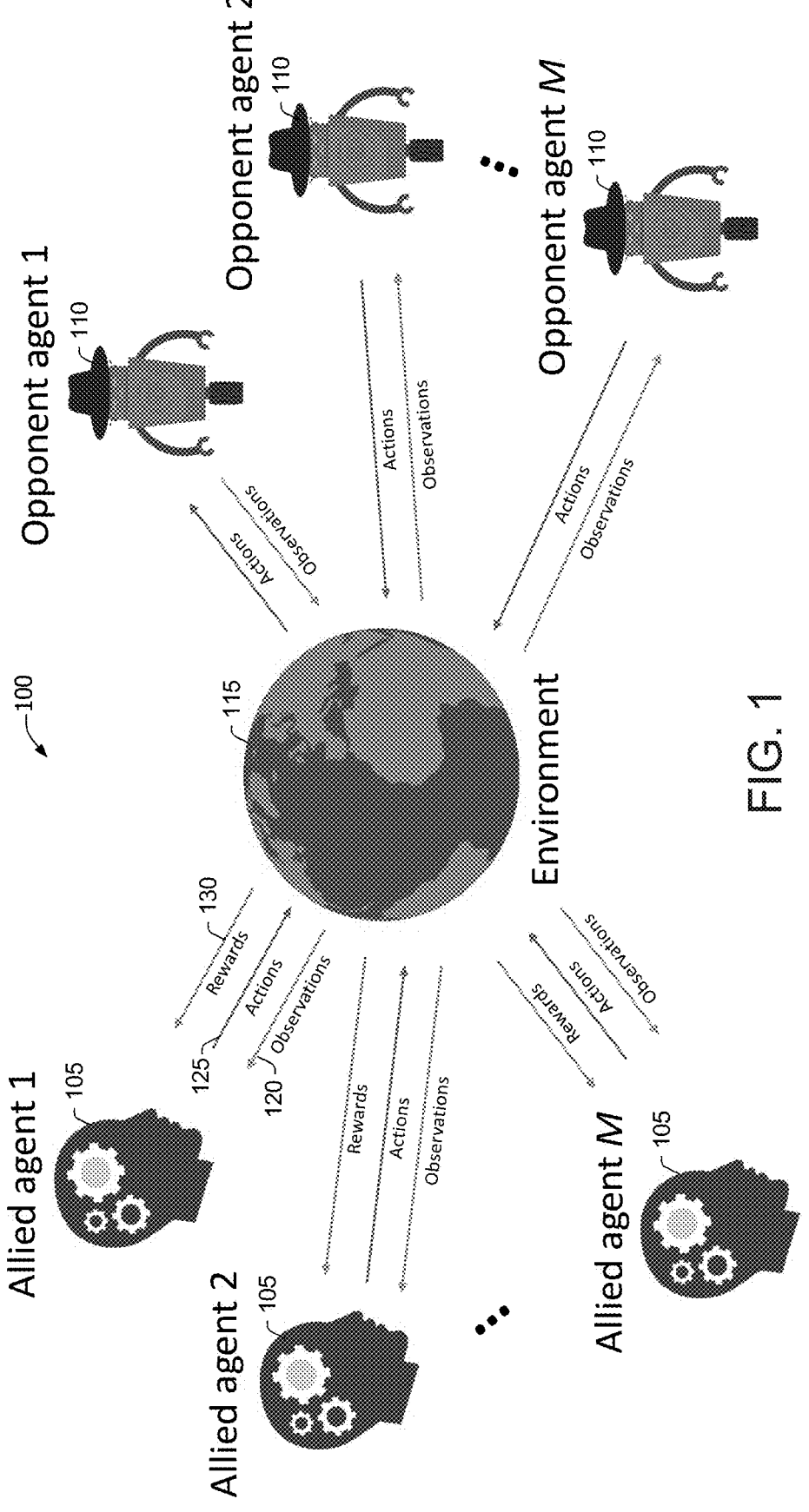
FIG. 1 illustrates a block diagram of a MvM adversarial environment, in accordance with one embodiment of the present disclosure.

The implementations described herein relate to multi-agent systems and, more specifically, to training and controlling multi-agent systems in multi-agent adversarial scenarios. More specifically, a multi-agent ("MA") computer device is provided for training and controlling multi-agent systems.

The systems and methods in this disclosure describe a hierarchical architecture to leverage the fact that the controllers for the high-level and low-level actions, while communicating with each other, can indeed be different and separate from each other. For the purposes of this discussion, adversarial environment is used, where the goal of the agents is to win against an opponent team of agents. In the exemplary embodiment of this disclosure, the agents are divided into two hierarchical categories. High-level agents (also known as supervisor level agents) are responsible for assigning targets for each of the agents in the team. The team is made up of low-level agents (also known as platform level agents). The low-level agents interact with the environment and targets by controlling platforms, which interact directly and indirectly with the environment and the targets. Once the targets are assigned, the low-level agents (platform level agents) make the low-level movement decisions (actions) for their corresponding platforms.

In this disclosure, the problem of controlling agents is approached in a multi-agent adversarial environment, where the controlled agents need to cooperate to win over a team of opponent agents. In the exemplary embodiment, the controlled agents are trained to make decisions in a distributed manner. This uses a hierarchical approach, where each platform level agent is associated with a supervisor level agent. The supervisor level agent makes the high-level behavioral decisions, such as which opponents to target. The platform level agent takes short-term actions, such as physical movements.

In at least one embodiment of this disclosure, value factorization methods are used with the high-level agents. The low-level agents can be neuroevolution agents to make the low-level movement decisions. As described further below, the high-level and low-level agents can be trained in a variety of ways, either together with each other or in isolation.

In at least one embodiment, the system is used in a multi-agent environment, where a number of M agents interact with each other and the environment by, for example, receiving partial observations from their surroundings, taking actions, and receiving rewards for those actions over time. The goal of the agents is to make decisions, such that their cumulative rewards over time are maximized.

Described herein are computer systems such as the MA computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers; reduced instruction set circuits (RISC), application-specific integrated circuits (ASICs), logic circuits, and any other circuit or processor capable of executing the functions described herein. The above examples are example only and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California)

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, California). In yet a further embodiment, the system is run on a Mac OS® environment (Mac OS is a registered trademark of Apple Inc. located in Cupertino, California). In still yet a further embodiment, the system is run on Android® OS (Android is a registered trademark of Google, Inc. of Mountain View, California). In another embodiment, the system is run on Linux® OS (Linux is a registered trademark of Linus Torvalds of Boston, MA). The application is flexible and designed to run in various different environments without compromising any major functionality.

The application is flexible and designed to run in various different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 illustrates a block diagram of a MvM adversarial environment 100, in accordance with one embodiment of the present disclosure. In adversarial environment 100, there are allied agents 105, which are also considered low-level agents and/or platform level agents. In adversarial environment 100, there are also opponent agents 110. While the number of allied agents 105 and opponent agents 110 are the same in this Figure, the environment can include more of one type or the other of agents 105 or 110. Allied agents 105 represent systems or platforms that are working on behalf of the user, while opponent agents 110 represent those in opposition. For example, in an electrical grid environment, allied agents 105 represent resources capable of providing electrical power, while opponent agents 110 represent the consumers of electrical power. In the electrical grid environment, the allied agents 110 are attempting to provide electrical power to satisfy the needs of the opponent agents 110.

In the adversarial environment 100, the allied agents 105 must account for and respond to the actions of the opponent agents 110 as well as the environment 115 where the engagement is taking place. The environment 115 may include physical obstacles as well as devices or other objects that the allied agents 105 must account for in their actions. In the exemplary embodiment, the allied agents 105 receive observations 120 from the environment 115 and opponent agents 110. In response, the allied agents 105 take actions 125 and receive rewards 130 based on those actions 125. Furthermore, the opponent agents 110 receives the actions 125 of the allied agents 105 to respond to.

In the exemplary embodiment, allied agents 105 and opponent agents 110 each include a plurality of attributes that allow them to take actions 125 and to limit their individual actions 125, for example, attributes can include, but are not limited to, speed, turning radius, range, acceleration, etc. In some embodiments, allied agents 105 and opponent agents 110 are each vehicles, such as autonomous and/or semi-autonomous vehicles. The vehicles can be, but are not limited to, ground-based vehicles, water-based vehicles, airborne vehicles, and space vehicles. While the agents 105 and 110 are described as vehicles, the agents can represent other objects, such as electrical systems, individuals, computer simulations, businesses, and/or any other objects and/or entities that the user desires to simulate.

Figure 2:
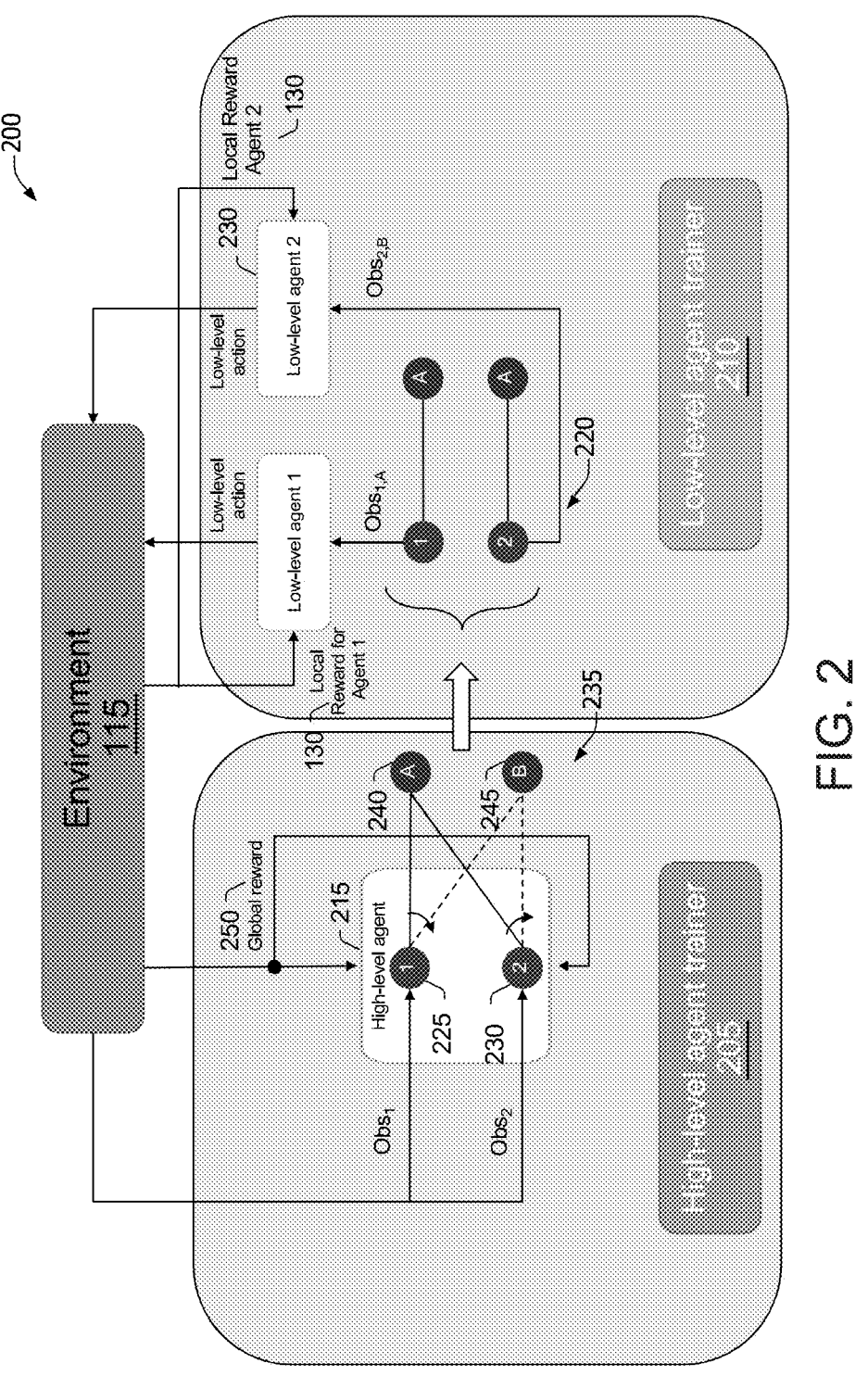
FIG. 2 illustrates a system architecture for training the agents shown in FIG. 1 in the adversarial environment shown in FIG. 1.

FIG. 2 illustrates a system architecture 200 for training the agents 105 (shown in FIG. 1) in the adversarial environment 100 (shown in FIG. 1).

To handle the adversarial environment 100, the system architecture 200 considers two levels of agents. A high-level agent (or supervisor level agent) makes decisions based on the high-level behavior exhibited by the allied agents 105. The high-level behavior can correspond to longer-term actions, including, but not limited to, target assignment behavior. The low-level agents (or platform level agents) decide on the low-level behavior of those agents. For example, given a target assigned to each of the allied agents 105 from the high-level agent, the low-level agent uses observations 120 (shown in FIG. 1) with respect to the assigned target opponent agent 110 (shown in FIG. 1) to select physical movements, such as heading and speed, in response to those actions.

In some embodiments, the low-level agents are pre-trained in one on one scenarios. In these embodiments, an allied agent 105 (low-level agent) is trained to respond to an individual opponent agent 110. Since in this situation the high-level agent's task is trivial, the low-level agents can be trained in isolation to master the actions 125 required to respond to a single opponent agent 110. After the low-level agent has been trained, the trained low-level agent can then be used in multiple agent environments, such as adversarial environment 100.

In other embodiments, the low-level agent can instead be trained directly in scenarios in the MvM environment, where the high-level agent is frozen, such as only assigning allied agents 105 to the closest opponent agent 110. Once the low-level agent is trained in this situation, the low-level agent is frozen, and the high-level agent is trained.

In still further embodiments, both the high-level agent and the corresponding low-level agents are trained simultaneously in the MvM environment 100. In this scenario, the low-level decisions are more critical in the short-term than the high-level decisions. Accordingly, the low-level agent is trained more frequently than the high-level agent.

In the exemplary embodiment, the architecture 200 could be used for training, simulation, and control of high-level and low-level agents. Architecture 200 includes a high-level agent trainer 205 and a low-level agent trainer 210. The high-level agent trainer 205 is configured to train a high-level agent 215 to control one or more low-level agents 220. In this version, there are two low-level agents 220, low-level agent 1 225 and low-level agent 2 230. There can be more low-level agents 220 depending on the situation. In this engagement, there are two low-level agents 220, which are allied agents 105 and two opponent agents 110, opponent A 240 and opponent B 245.

In the architecture 200, the high-level agent 215 selects a target 235 for each of the low-level agents 220. In this example, the high-level agent 215 selects opponent A 240 as the target 235 for both low-level agent 1 225 and low-level agent 2 230. Then the low-level agent trainer 210 takes over. Low-level agent 1 225 takes one or more low-level actions 125 based on opponent A 240. Low-level agent 2 230 takes one or more low-level actions 125 based on opponent A 240 as well. The low-level agent trainer 210 provides one or more rewards 130 for each of low-level agent 1 225 and low-level agent 2 230 based on how the one or more actions 125 changed the situation with opponent A 240. For example, as an individual low-level agent 220 takes an action that brings it closer to a win condition, the individual low-level agent 220 may receive a reward 130. As the low-level agent 220 gets closer to the win condition, the higher the reward 130. The low-level agent trainer 210 and the high-level agent trainer 205 continue through the engagement until complete. For example, if opponent A 240 is defeated, then high-level agent 215 will reassign low-level agent 1 225 and low-level agent 2 230 to opponent B 245. However, while low-level agent 1 225 and low-level agent 2 230 are taking actions 125, opponents A 240 & B 245 are also taking actions. For example, opponent B 245 could achieve a win condition on low-level agent 1 225 while low-level agent 1 225 is targeting opponent A 240.

The high-level agent trainer 205 also provides one or more global rewards 250 to the high-level agent 215 based on the results of the engagement or scenario. For example, if the low-level agents 1 225 and 2 230 win over opponent A 240 and opponent B 245, then the global reward 250 is a positive. If the low-level agents 1 225 and 2 230 lose, then the global reward 250 is negative. In some examples, the global reward 250 could be based on a scale. For example, if the opponents A 240 and B 245 were defeated, but one of the low-level agents 220 did not survive the engagement, then the global reward 250 may be less than if both low-level agents 220 survived.

In the exemplary embodiment, the low-level agents 220 and the high-level agents 215 are repeatedly trained through a plurality of scenarios and situations. The different scenarios and situations may have different numbers and/or capabilities of opponent agents 110, different numbers and/or capabilities of allied agents 105, different environmental features, different win conditions, and a plurality of other factors to train both the low-level agents 220 and the high-level agents 215 to react to observations 120 and handle any situation.

While, the above describes a centralized method for training high-level agents 215, the high-level agents 215 make target assignment decisions on their own, in a distributed manner. In some embodiments, the training can be done with value decomposition networks. This allows the high-level agents 215 to be trained in a centralized way using the global team reward, enabling the high-level agents 215 to make independent simultaneous decisions during inference.

While a single high-level agent 215 is shown, there may be multiple high-level agents 215, each controlling one or more low-level agents 220. In further embodiments, multiple high-level agents 215 can be trained to work together through multiple scenarios.

In a deployed environment, the high-level agent 215 receives one or more observations 120 about each of the low-level agents 220 and the targets 235. Observations 120 can include attributes, for example, but not limited to, current speed, altitude, and heading. In some embodiments, the high-level agent 215 stores a plurality of capabilities of the low-level agents 220. Based on the stored capabilities and the received observations 120, the high-level agent 215 makes one or more decisions to determine which opponents 110 to assign to each associated low-level agent 220. The determinations are based on the received observation and the training of the high-level agent 215. The low-level agents 220 are informed of their assigned targets 235. Then the low-level agents 220 take one or more actions 125 based on their targets 235. The low-level agents 220 can also receive and make the determinations based on observations 120 about the environment 115 and/or the target opponent 235.

Each allied agent 105 is assumed to observe 120 relative information from all the opponent agents 110. In one embodiment, with respect to each of the M opponent agents 110, each allied agent 105 observes five pieces of information: Relative distance (m), Closing speed (m/s), Relative bearing of the target 235 (deg), Relative heading of the target 235 (deg), and Cross speed (m/s).

For each of the low-level agents 220, the observation 120 at each time step is limited only to the opponent agent 235 that it is assigned to by the high-level agent 215 at that step. Therefore, the low-level agent 220 observes a 5-dimensional vector at each time step.

The high-level agent 215 is responsible for target assignment decisions. Therefore, for each allied agent 105, the high-level action space is M-dimensional, with the ith action

125 corresponding to assigning the ith opponent agent 110. Once the targets 235 are assigned by the high-level agents 215, each low-level agent 220 decides on the heading and speed of the corresponding allied agent 105. The architecture 200 considers a 5-dimensional action space consisting of the following actions: turn left, turn right, speed up, slow down, and hold course (no change in heading and speed).

In the exemplary embodiment, the architecture 200 uses two reward types, a sparse reward 250 and a dense reward 130. The sparse reward 250 is only emitted at the encounter termination, and depends on whether the result was a win, loss, or a draw. A win is if all of the opponent agents 110 are defeated, and the sparse reward 250 is equal to the number of remaining allied agents 105 at the end of the encounter. A loss is if all of the allied agents 105 are defeated, and the sparse reward 250 is equal to a negative of one plus the number of opponent agents 110 remaining at the end of the encounter. A draw would be where a different condition caused the encounter to end, such as hitting a time limit. In this case, the sparse reward 250 would be −1.

A dense reward 130 is configured to provide more information about each action of the agent 105 in question. For example, in one example, a dense reward 130 could be provided in a scenario where the allied agents 105 and opponent agents 110 are modeled as aircraft. In this scenario, the goal of the individual allied agents 105 is to get in a position behind and a specific distance away from the targeted opponent agent 110. The distance between the allied agent 105 and its target opponent agent 110 is R. This scenario also tracks the aspect angle (AA), antenna train angle (ATA), and heading crossing angle (HCA) between the two aircraft. Accordingly, in this scenario, the dense reward 130 between each allied agent 105 and each opponent agent 110 is:

$$\text{Dense Reward} = \begin{cases} -S_A S_R & \text{if } R < R_{threshold} \\ -1 & \text{otherwise} \end{cases} \quad \text{EQ. 1}$$

where $R_{threshold}$ denotes a threshold distance for agent 105 to agent 110 distance, and where $S_A$ and $S_R$ are defined as:

$$S_A = 1 - \left[ \left( 1 - \frac{AA}{180} \right) + \left( 1 - \frac{AA}{180} \right) \right] \quad \text{EQ. 2}$$

$$S_R = e^{-\left( \frac{|R - R_d|}{180k} \right)} \quad \text{EQ. 3}$$

where $R_d$ denotes the desired distance between agents and k is a hyperparameter. This specific reward design encourages allied agents 105 to get closer to their target opponent agents 110 and follow behind them.

With the sparse team reward 250 denoted by $R_{sparse}$ and the dense reward 130 between the $i^{th}$ allied agent 105 and the $j^{th}$ opponent agent as $R_{dense,ij}$.

For high-level agents 215, the global reward 250 is determined as:

$$\text{Reward}_{Hihg-level} = R_{sparse} + w_{dense} \sum_{i=1}^{M} R_{dense,ij} \quad \text{EQ. 4}$$

where $W_{dense}$ is the weight of the dense rewards 130, and for the $i^{th}$ allied agent 105, $j_i$ denotes the index of assigned opponent agent 110 by the high-level agent 215.

For the $i^{th}$ low-level agent 105, the reward 130 at each step would be equal to $R_{dense,ij}$, i.e., the dense reward 130 with respect to the assigned opponent 110.

In at least one embodiment, a 1v1 Neuroevolution agent training procedure can be used to train individual low-level agents 220. The training procedure includes randomly initializing a set Π of N parameter vectors. Each parameter vector defining weights for one neural network. For each iteration of the training procedure with k iterations, the low-level agent trainer 210 performs evaluation, selection, replication, and mutation steps.

For the evaluation step, the low-level agent trainer 210 evaluates each parameter vector π in Π. The low-level agent trainer 210 starts a new simulation episode with randomized initial conditions. For each simulation time-step i until the episode ends, the low-level agent trainer 210 obtains the observations 120 of the agent 220 with respect to the target 235. The low-level agent trainer 210 applies the neural network specified by π with the input observations 120 to produce an output action 125. The low-level agent trainer 210 specifies to the environment 100 that the agent 220 will take the output action 125. Then the low-level agent trainer 210 performs one step of the simulated dynamics of the environment 100. This repeats until the episode ends. Then the low-level agent trainer 210 stores the fitness value returned by the environment 100 in a data structure that associates the fitness value with π. The Evaluation step repeats for each parameter vector π in Π.

For the selection step, the low-level agent trainer 210 determines a threshold fitness value T to be at a certain percentile, such as 70%, obtained during evaluation. The low-level agent trainer 210 deletes all parameter values associated with a fitness score lower than T from Π.

For the replication step, the low-level agent trainer 210 creates a new full set of parameter vectors Π by sampling uniformly with replacement from Π. For the mutation step, the low-level agent trainer 210 adds a number sampled from a Gaussian distribution to each element of each parameter vector.

In at least one embodiment, a high-level target assignment QMIX agent training procedure can be performed by the high-level agent trainer 205. The high-level agent trainer 205 randomly initializes a set of parameters $\pi_{RNN}$ for each QMIX agent, and $\pi_{QMIX}$ for the mixing network. For each training episode with randomized initial conditions for each of the 2M agents, the high-level agent trainer 205 performs inference and training steps.

For the Inference step, for each simulation time-step i until the episode ends, the high-level agent trainer 205 performs a series of steps.

For the $i^{th}$ allied agent 220, i∈{1, . . . , M}, the high-level agent trainer 205 obtains the observation 120 of the agent 220 with respect to all the opponent agents 235. The high-level agent trainer 205 applies the neural network specified by $\pi_{RNN}$ to input the observations 120 to produce output state-action 125 values. The high-level agent trainer 205 selects a target assignment action ai using an ε-greedy policy. The high-level agent trainer 205 obtain the observation 120 of the agent 220 with respect to its assigned target 235. The high-level agent trainer 205 applies the neural network specified by the low-level neuroevolution agent to input observations 120 to produce a low-level action 125. The high-level agent trainer 205 specifies to the environment 115 that in the next step, the $i^{th}$ allied agent 220 will take low-level action 125.

The high-level agent trainer 205 perform one time-step of simulated dynamics in the environment 115. The high-level agent trainer 205 collects the reward 250 based on the joint actions 125 of all agents 220. The high-level agent trainer 205 saves the transition of observations 120, actions 125, and rewards 130 to a replay buffer.

For the training step, the high-level agent trainer 205 fetches a set of B episodes from the replay buffer and update the QMIX agent and mixing network parameters, $\pi_{RNN}$ and $\pi_{QMIX}$, using the transitions in the sampled episodes based on the loss function:

$$L = \left[ Q_{global}(t) - \left( r_{global}(t) + \max_{a_1(t+1), \dots a_M(t+1)} Q_{global}(t+1) \right) \right]^2 \quad \text{EQ. 5}$$

While the above are example methodologies for training a specific set of allied agents 105 in response to a specific type of opponent agents 110, other methodologies, algorithms, equations, and attributes can be used to train other sets of allied agents 105 against other sets of opponent agents 110.

Figure 3:
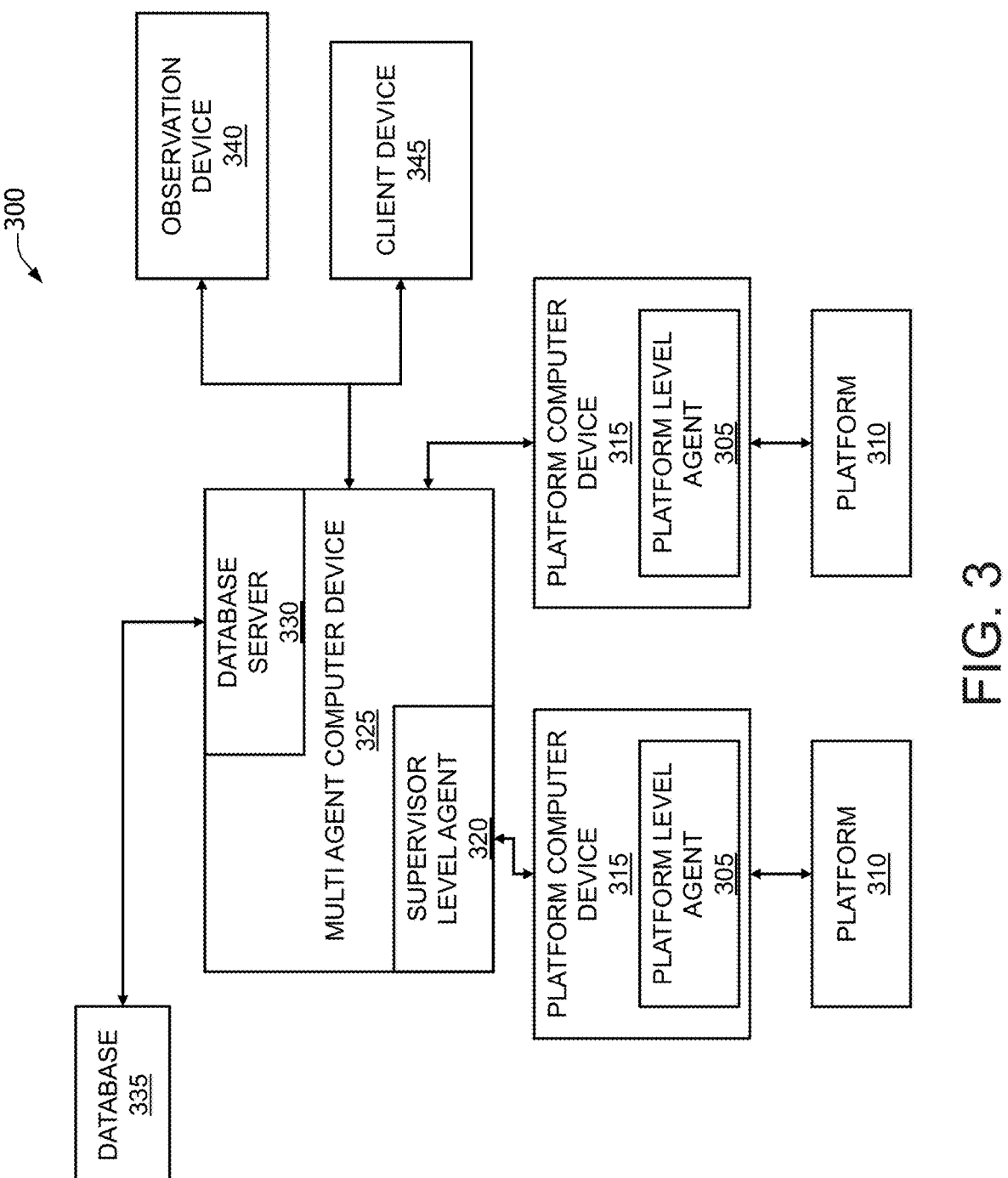
FIG. 3 illustrates a block diagram of a system for controlling a plurality of allied agents shown in FIG. 1.

FIG. 3 illustrates a block diagram of a system 300 for controlling a plurality of allied agents 105 (shown in FIG. 1). In the exemplary embodiment, the system 300 is configured to control trained allied agents 105, such as those trained using the architecture 200, including high-level agents 215 and low-level agents 220 (all shown in FIG. 2).

In the exemplary embodiment system 300 includes a plurality of platform level agents 305, which are similar to allied agents 105 and low-level agents 220. Each platform level agent 305 controls an individual platform 310. Platforms 310 are devices or systems that can be controlled to perform actions. In some embodiments, platforms 310 are capable of making observations of their environment 115 (shown in FIG. 1) and/or observations of one or more opponent agent platforms. In one example, platforms 310 are aircraft and take one or more actions 125 (shown in FIG. 1) in response to opponent agent platforms, which are also aircraft. In other embodiments, platforms 310 can include, but are not limited to, drones, ground-based vehicles, water-based vehicles, aerospace craft, electrical substations, and space craft. The environments 100 for these platforms 310 can include, but is not limited to, air traffic control, power grids, drone swarms, autonomous driving, and any other scenario where agents may act in opposition.

In the example, platform level agents 305 are executed on platform computer devices 315 that include a web browser or a software application, which enables platform level agents 305 to communicate with the supervisor level agent 320 on a multi agent computer device 325 using the Internet, a local area network (LAN), or a wide area network (WAN). In some examples, the platform computer devices 315 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Platform computer devices 315 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. Furthermore, in some embodiments, a single platform computer device 315 may execute multiple platform level agents 305. In some embodiments, platform computer devices 315 are installed on their corresponding platforms 310.

The multi agent computer device 325 includes at least one application executing on the multi agent computer device 325 to execute the supervisor level agent 320. The supervisor level agent 320 is similar to the high-level agent 215 (shown in FIG. 2). The supervisor level agent 320 may be provided as a cloud-based web-service over the Internet or other network. In the example, the supervisor level agent 320 is executed on computers that include a web browser or a software application, which enables the multi agent computer device 325 to communicate with the platform computer devices 315 using the Internet, a local area network (LAN), or a wide area network (WAN). In some examples, the multi agent computer device 325 is communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Platform computer device 315 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In some embodiments, the multi agent computer device 325 executes one or more of high-level agent trainer 205, a low-level agent trainer 210, and architecture 200 (all shown in FIG. 2).

A database server 330 is communicatively coupled to a database 335 that stores data. In one example, the database 335 is a database that includes a plurality of parameters for platforms 310, a plurality of environmental information, one or more trained agents, information about potential targets 235 (shown in FIG. 2), training scenarios, and additional information. In some examples, the database 335 is stored remotely from the multi agent computer device 325. In some examples, the database 335 is decentralized. In the example, a person can access the database 335 via the client device 345 by logging onto multi agent computer device 325.

In the example, observation devices 340 are computers that include a web browser or a software application, which enables observation devices 340 to communicate with the multi agent computer device 325 and/or the platform computer devices 315 using the Internet, a local area network (LAN), or a wide area network (WAN). In some examples, the observation devices 340 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Observation devices 340 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. The observation devices 340 can be accessed by the multi agent computer device 325 and/or platform computer devices 315 to access data to use in making decisions. Observation devices 340 can include natural terrain data, urban terrain data, weather information, target device/agent data, and any other data necessary for agent use.

In the example, client devices 345 are computers that include a web browser or a software application, which enables client devices 345 to communicate with the multi agent computer device 325 and/or the platform computer devices 315 using the Internet, a local area network (LAN), or a wide area network (WAN). In some examples, the client devices 345 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client devices 345 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. The client devices 345 can access the multi agent computer device 325, the platform computer devices 315, and/or the database 335.

FIG. 4 illustrates a process 400 for controlling agents using the system 300 (shown in FIG. 3) in the adversarial environment 100 (shown in FIG. 1). Process 400 can be executed by the multi agent computer device 325 (shown in FIG. 3).

The multi agent computer device 325 executes 405 a supervisor level agent 320 (shown in FIG. 3) configured to select at least one of a target 235 (shown in FIG. 2) or a goal for one or more platforms 310 including the first platform 310 (both shown in FIG. 3). The multi agent computer device 325 receives 410 targeting information including one or more targets 235, such as from observation device 340 (shown in FIG. 3). The multi agent computer device 325 receives 415 platform information for the one or more platforms 310, such as from database 335 (shown in FIG. 3). The multi agent computer device 325 receives 410 observations 120 (shown in FIG. 1) from the observation device 340 as well as information about one or more of the platforms 310, the targets 235, and/or the platform level agents 305 (shown in FIG. 3). The multi agent computer device 325 uses the information and the observations 120, as well as it's training to select 420, by the supervisor level agent 320, a target 235 of the one or more targets 235 based on the target information and the platform information.

The multi agent computer device 325 transmits 425, to the first platform level agent 305 (shown in FIG. 3), the selected target 235. The first platform level agent 305 is configured to control the first platform 310 based on the selected target 235.

In some embodiments, the one or more platforms 310 includes a second platform 310 including a second platform level agent 305 configured to direct one or more actions of the second platform 310. The multi agent computer device 325 selects 420, by the supervisor level agent 320, a second target 235 of the one or more targets 235 based on the target information and the platform information. The multi agent computer device 325 transmits 425, to the second platform level agent 305, the selected second target 235. The second platform level agent 305 is configured to control the second platform 310 based on the selected second target 235.

In some further embodiments, the first platform 310 includes the first platform computer device 315 (shown in FIG. 3), which executes the first platform level agent 305 that controls the first platform 310.

In still further embodiments, the multi agent computer device 325 trains the first platform level agent 305 using one on one training scenarios including the first platform 310 and a first target 235.

In even further embodiments, the multi agent computer device 325 trains the supervisor level agent 320 using a plurality of scenarios including a plurality of targets 235 and a plurality of trained platform level agents 305. The multi agent computer device 325 trains the supervisor level agent 320 by rewarding the supervisor level agent 320 based on overall performance of the plurality of trained platform level agents 305 in relation to the plurality of targets 235 in each of the plurality of scenarios. In some embodiments, the rewarding based on the overall performance includes providing at least one of a sparse reward 250 (shown in FIG. 2) or a dense reward 130 (shown in FIG. 1).

In additional embodiments, the multi agent computer device 325 receives at least one of updated target information and updated platform information. For example, the multi agent computer device 325 receives the updated information from one or more observation devices 340. The multi agent computer device 325 updates the selected target 235 based on the updated target information and/or the updated platform information.

In some embodiments, the first platform 310 includes one or more sensors. The one or more sensors are configured to receive the target information and/or the platform information. The first platform 310 is configured to transmit the target information and/or the platform information to the supervisor level agent 320.

In some embodiments, the first platform 310 is a vehicle. The first platform 310 could be at least one of an aircraft, a spacecraft, a land vehicle, a water vehicle, and a submarine. The vehicle could be one of a manned vehicle and an unmanned vehicle.

Figure 5:
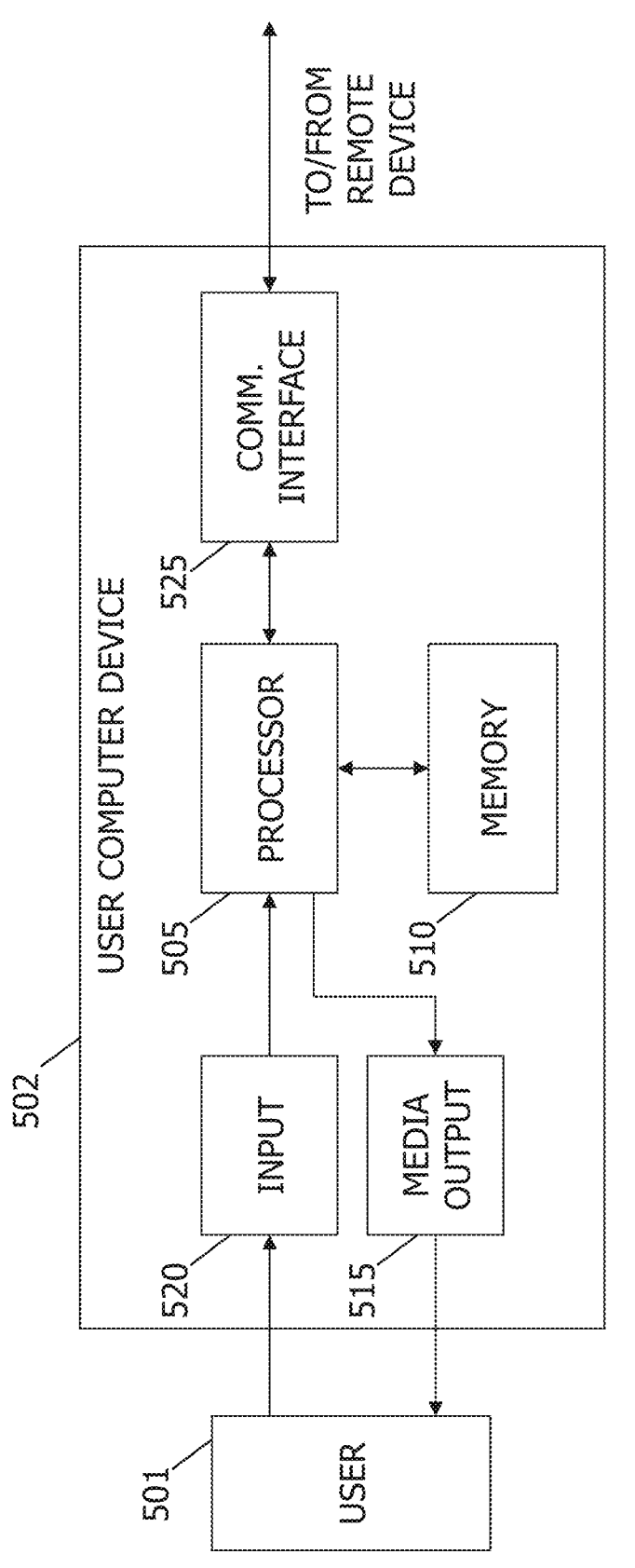
FIG. 5 illustrates an example configuration of a user computer device used in the system shown in FIG. 3, in accordance with one example of the present disclosure

FIG. 5 illustrates an example configuration of a user computer device 502 used in the system 300 (shown in FIG. 3), in accordance with one example of the present disclosure. User computer device 502 is operated by a user 501. The user computer device 502 can include, but is not limited to, the client device 345, observation device 340, and the platform computer device 315 (all shown in FIG. 3). The user computer device 502 includes a processor 505 for executing instructions. In some examples, executable instructions are stored in a memory area 510. The processor 505 can include one or more processing units (e.g., in a multi-core configuration). The memory area 510 is any device allowing information such as executable instructions and/or transaction data to be stored and retrieved. The memory area 510 can include one or more computer-readable media.

The user computer device 502 also includes at least one media output component 515 for presenting information to the user 501. The media output component 515 is any component capable of conveying information to the user 501. In some examples, the media output component 515 includes an output adapter (not shown) such as a video adapter and/or an audio adapter. An output adapter is operatively coupled to the processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 515 is configured to present a graphical user interface (e.g., a web browser and/or a client application) to the user 501. A graphical user interface can include, for example, an interface for viewing the performance information about the allied agents 105 (shown in FIG. 1). In some examples, the user computer device 502 includes an input device 520 for receiving input from the user 501. The user 501 can use the input device 520 to, without limitation, select one or more platforms 310 (shown in FIG. 3) to use. The input device 520 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 515 and the input device 520.

The user computer device 502 can also include a communication interface 525, communicatively coupled to a remote device such as the multi agent computer device 325 (shown in FIG. 3). The communication interface 525 can include, for example, a wired or wireless network adapter and/or a wireless data transceiver for use with a mobile telecommunications network.

Stored in the memory area 510 are, for example, computer-readable instructions for providing a user interface to the user 501 via the media output component 515 and, optionally, receiving and processing input from the input device 520. A user interface can include, among other possibilities, a web browser and/or a client application. Web browsers enable users, such as the user 501, to display and interact with media and other information typically embedded on a web page or a website from the multi agent computer device 325. For example, instructions can be stored by a cloud service, and the output of the execution of the instructions sent to the media output component 515.

The processor 505 executes computer-executable instructions for implementing aspects of the disclosure.

Figure 6:
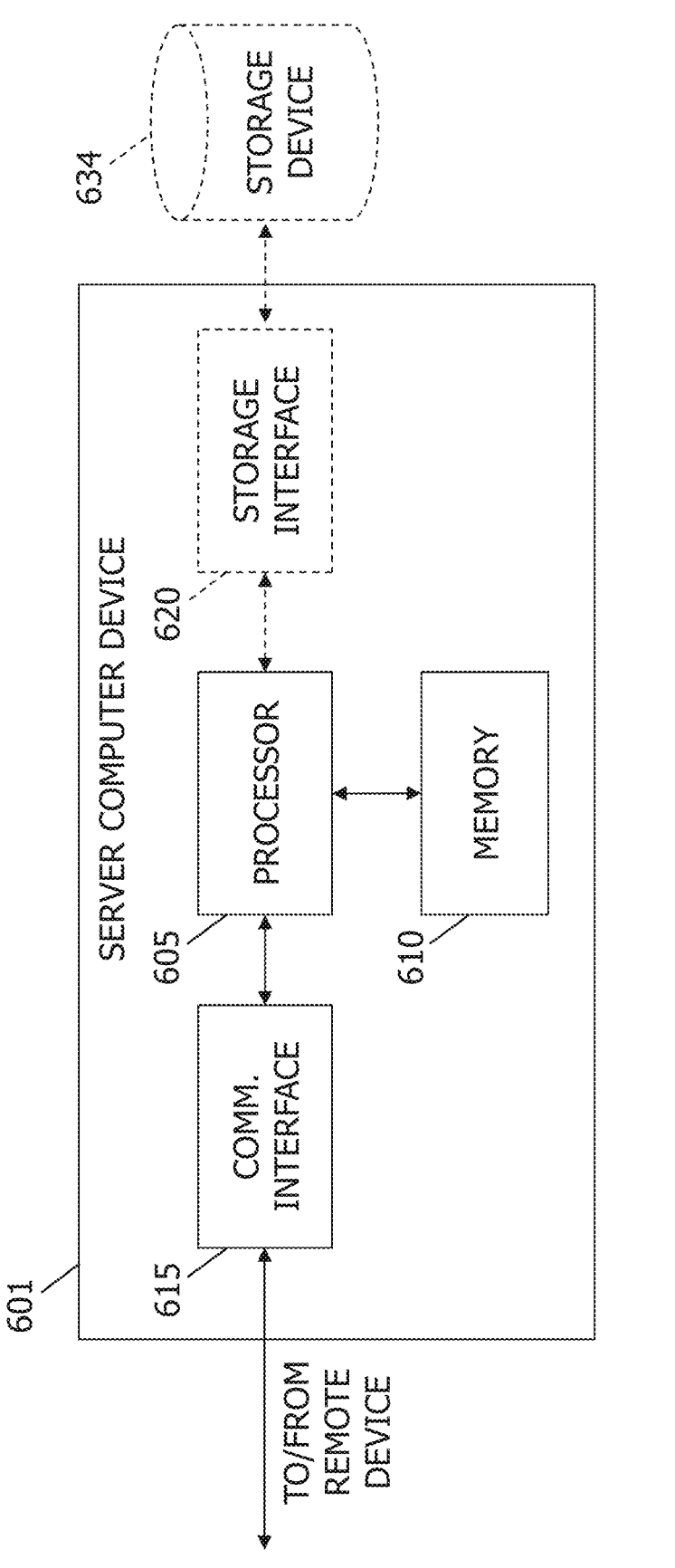
FIG. 6 illustrates an example configuration of a server computer device used in the system shown in FIG. 3, in accordance with one example of the present disclosure.

FIG. 6 illustrates an example configuration of a server computer device 601 used in the system 300 (shown in FIG. 3), in accordance with one example of the present disclosure. Server computer device 601 can include, but is not limited to, the multi agent computer device 325, observation device 340, and the database server 330 (all shown in FIG. 3). The server computer device 601 also includes a processor 605 for executing instructions. Instructions can be stored in a memory area 610. The processor 605 can include one or more processing units (e.g., in a multi-core configuration).

The processor 605 is operatively coupled to a communication interface 615 such that the server computer device 601 is capable of communicating with a remote device such as another server computer device 601, one or more platform computer devices 315, observation device 340, or client device 345 (all shown in FIG. 3). For example, the communication interface 615 can receive requests from the client device 345 via the Internet, as illustrated in FIG. 3.

The processor 605 can also be operatively coupled to a storage device 634. The storage device 634 is any computer-operated hardware suitable for storing and/or retrieving data, such as, but not limited to, data associated with the database 335 (shown in FIG. 3). In some examples, the storage device 634 is integrated in the server computer device 601. For example, the server computer device 601 can include one or more hard disk drives as the storage device 634. In other examples, the storage device 634 is external to the server computer device 601 and can be accessed by a plurality of server computer devices 601. For example, the storage device 634 can include a storage area network (SAN), a network attached storage (NAS) system, and/or multiple storage units such as hard disks and/or solid-state disks in a redundant array of inexpensive disks (RAID) configuration.

In some examples, the processor 605 is operatively coupled to the storage device 634 via a storage interface 620. The storage interface 620 is any component capable of providing the processor 605 with access to the storage device 634. The storage interface 620 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 605 with access to the storage device 634.

The processor 605 executes computer-executable instructions for implementing aspects of the disclosure. In some examples, the processor 605 is transformed into a special purpose microprocessor by executing computer-executable instructions or by otherwise being programmed. For example, the processor 605 is programmed with instructions such as those shown in FIG. 4.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for determining a direction of arrival of a wireless signal. The system and methods described herein address that technical problem. Additionally, at least one of the technical solutions to the technical problems provided by this system may include: (i) improved accuracy in processing multi-agent engagements; (ii) improved control of the allied agents in multi-agent engagements; (iii) reduced need for repeated training of similar platforms; (iv) reduced processing requirements in individual platforms or controlling those individual platforms; and (v) up-to-date platform control.

The methods and systems described herein may be implemented using computer programming or engineering techniques including computer software, firmware, hardware, or any combination or subset thereof, wherein the technical effects may be achieved by performing at least one of the following steps: a) execute a supervisor level agent configured to select at least one of a target or a goal for one or more platforms including the first platform; b) receive targeting information including one or more targets; c) receive platform information for the one or more platforms; d) select, by the supervisor level agent, a target of the one or more targets based on the target information and the platform information; e) transmit, to the first platform level agent, the selected target, wherein the first platform level agent is configured to control the first platform based on the selected target; f) select, by the supervisor level agent, a second target of the one or more targets based on the target information and the platform information; g) transmit, to the second platform level agent, the selected second target, wherein the second platform level agent is configured to control the second platform based on the selected second target; h) execute the first platform level agent to control the first platform; i) train the first platform level agent using one on one training scenarios including the first platform and a first target; j) train the supervisor level agent using a plurality of scenarios including a plurality of targets and a plurality of trained platform level agents; k) train the supervisor level agent by rewarding the supervisor level agent based on overall performance of the plurality of trained platform level agents in relation to the plurality of targets in each of the plurality of scenarios; l) rewarding based on the overall performance includes at least one of a sparse reward or a dense reward; m) receive updated target information; n) receive updated platform information; o) update the selected target based on the updated target information and the updated platform information; p) receive the target information and the platform information; and q) transmit the target information and the platform information to the supervisor level agent Machine Learning & Other Matters The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

In some embodiments, the design system is configured to implement machine learning, such that the neural network "learns" to analyze, organize, and/or process data without being explicitly programmed. Machine learning may be implemented through machine learning (ML) methods and algorithms. In an exemplary embodiment, a machine learning (ML) module is configured to implement ML methods and algorithms. In some embodiments, ML methods and algorithms are applied to data inputs and generate machine learning (ML) outputs. Data inputs may include but are not limited to: analog and digital signals (e.g. sound, light, motion, natural phenomena, etc.) Data inputs may further include: sensor data, image data, video data, and telematics data. ML outputs may include but are not limited to: digital signals (e.g. information data converted from natural phenomena). ML outputs may further include: speech recognition, image or video recognition, medical diagnoses, statistical or financial models, autonomous vehicle decision-making models, robotics behavior modeling, fraud detection analysis, user input recommendations and personalization, game AI, skill acquisition, targeted marketing, big data visualization, weather forecasting, and/or information extracted about a computer device, a user, a home, a vehicle, or a party of a transaction. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, recurrent neural networks, Monte Carlo search trees, generative adversarial networks, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function which maps outputs to inputs and utilize the predictive function to generate ML outputs based on data inputs. The example inputs and example outputs of the training data may include any of the data inputs or ML outputs described above. For example, a ML module may receive training data comprising data associated with different images and their corresponding classifications, generate a model which maps the image data to the classification data, and recognize future images and determine their corresponding categories.

In another embodiment, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship. In an exemplary embodiment, a ML module coupled to or in communication with the design system or integrated as a component of the design system receives unlabeled data comprising event data, financial data, social data, geographic data, cultural data, and political data, and the ML module employs an unsupervised learning method such as "clustering" to identify patterns and organize the unlabeled data into meaningful groups. The newly organized data may be used, for example, to extract further information about the potential classifications.

In yet another embodiment, ML methods and algorithms are directed toward reinforcement learning, which involves optimizing outputs based on feedback from a reward signal. Specifically ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In an exemplary embodiment, a ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict optimal constraints.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device.

Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

a first platform including a first platform level agent configured to direct one or more actions of the first platform based on at least one of a selected target or a selected goal, wherein the first platform includes an aircraft; and a computer system comprising at least one processor in communication with at least one memory device, wherein the computer system is in communication with the first platform level agent, wherein the memory device includes computer-executable instructions that when executed by the at least one processor cause the at least one processor to:

train the first platform level agent and a supervisor level agent on a plurality of training scenarios in an adversarial environment including a plurality of allied agents and a plurality of opponent agents, wherein the plurality of allied agents includes the first platform level agent, wherein the training comprises:

training the first platform level agent using a dense reward quantifying a goal of the first platform level agent; and training the supervisor level agent using a global reward comprising a sparse reward and a weighted sum of a plurality of dense rewards, wherein the sparse reward describes a result of a training scenario of the plurality of training scenarios, and wherein the plurality of dense rewards includes the dense reward of the first platform level agent;

execute the trained supervisor level agent configured to select at least one of a target or a goal for one or more platforms including the first platform;

receive targeting information including one or more targets;

receive platform information for the one or more platforms;

select, by the trained supervisor level agent, a target of the one or more targets based on the target information and the platform information; and transmit, to the trained first platform level agent, the selected target, wherein the trained first platform level agent controls the first platform based on the selected target.

2. The system in accordance with claim 1, further comprising a second platform including a second platform level agent configured to direct one or more actions of the second platform, and wherein the at least one processor of the computer device is further programmed to:

select, by the supervisor level agent, a second target of the one or more targets based on the target information and the platform information; and transmit, to the second platform level agent, the selected second target; and wherein the second platform level agent is configured to control the second platform based on the selected second target.

3. The system in accordance with claim 1, wherein the first platform further comprises at least one processor in communication with at least one memory device, where the at least one processor is programmed to execute the first platform level agent to control the first platform.

4. The system in accordance with claim 1, wherein the first plurality of training scenarios comprises scenarios having one or more of different numbers of opponent agents, different numbers of allied agents, different environmental features, or different win conditions.

5. The system in accordance with claim 1, wherein the first platform level agent is trained using a different dense reward for each of the plurality of opponent agents in a given training scenario of the plurality of training scenarios.

6. The system in accordance with claim 1, wherein each of the plurality of training scenarios comprises randomized initial conditions.

7. The system in accordance with claim 1, wherein the supervisor level agent is trained to perform target assignment.

8. The system in accordance with claim 1, wherein the at least one processor is further programmed to:

receive updated target information;

receive updated platform information; and update the selected target based on the updated target information and the updated platform information.

9. The system in accordance with claim 1, wherein the first platform comprises one or more sensors, wherein the one or more sensors are configured to receive the target information and the platform information, and wherein the first platform is configured to transmit the target information and the platform information to the supervisor level agent.

10. The system in accordance with claim 1, wherein the aircraft is one of a manned aircraft or an unmanned aircraft.

11. A method for controlling platforms, the method is implemented by a computer device including at least one processor in communication with at least one memory device, the method comprises:

training a first platform level agent and a supervisor level agent on a plurality of training scenarios in an adversarial environment including a plurality of allied agents and a plurality of opponent agents, wherein the plurality of allied agents includes the first platform level agent, wherein the training comprises:

training the first platform level agent using a dense reward quantifying a goal of the first platform level agent; and training the supervisor level agent using a global reward comprising a sparse reward and a weighted sum of a plurality of dense rewards, wherein the sparse reward describes a result of a training scenario of the plurality of training scenarios, and wherein the plurality of dense rewards includes the dense reward of the first platform level agent;

executing the trained supervisor level agent configured to select at least one of a target or a goal for one or more platforms including a first platform;

receiving targeting information including one or more targets;

receiving platform information for the one or more platforms;

selecting, by the trained supervisor level agent, a target of the one or more targets based on the target information and the platform information; and transmitting, to the trained first platform level agent, the selected target, wherein the trained first platform level agent controls the first platform based on the selected target.

12. The method in accordance with claim 11, further comprising:

selecting, by the supervisor level agent, a second target of the one or more targets based on the target information and the platform information; and transmitting, to a second platform level agent associated with a second platform, the selected second target; and wherein the second platform level agent is configured to control the second platform based on the selected second target.

13. The method in accordance with claim 11, wherein the plurality of training scenarios comprises scenarios having one or more of different numbers of opponent agents, different numbers of allied agents, different environmental features, or different win conditions.

14. The method in accordance with claim 11, wherein the first platform level agent is trained using a different dense reward for each of the plurality of opponent agents in a given training scenario of the plurality of training scenarios.

15. The method in accordance with claim 13, wherein each of the plurality of training scenarios comprises randomized initial conditions.

16. The method in accordance with claim 11 further comprising:

receiving updated target information;

receiving updated platform information; and updating the selected target based on the updated target information and the updated platform information.

17. The method in accordance with claim 11 further comprising receiving the target information and the platform information from one or more sensors associated with the first platform.

18. The method in accordance with claim 11, wherein the first platform includes a vehicle.

19. The method in accordance with claim 18, wherein the vehicle includes one of an aircraft, a spacecraft, a land vehicle, a water vehicle, or a submarine.

20. The method in accordance with claim 18, wherein the vehicle is one of a manned vehicle or an unmanned vehicle.

* * * * *